United States Patent [19]

Lang

[11] 4,219,093
[45] Aug. 26, 1980

[54] VEHICLE STEERING ASSIST

[75] Inventor: Armin Lang, Schwabisch Gmund, Fed. Rep. of Germany

[73] Assignee: Zahnradfabrik Friedrichshafen AG., Friedrichshafen, Fed. Rep. of Germany

[21] Appl. No.: 931,092

[22] Filed: Aug. 4, 1978

[51] Int. Cl.² .......................... B62D 5/06; B62D 1/28
[52] U.S. Cl. ...................................... 180/131; 60/420; 180/132; 404/84
[58] Field of Search ...................... 104/244.1; 180/131, 180/132, 98, 79; 404/84; 60/420

[56] References Cited

U.S. PATENT DOCUMENTS

| 3,774,401 | 11/1973 | Allen | 104/244.1 |
| 3,946,825 | 3/1976 | Gail | 180/131 |
| 4,131,176 | 12/1978 | Ruoff | 180/131 |

Primary Examiner—John J. Love
Assistant Examiner—Donn McGiehan
Attorney, Agent, or Firm—Zalkind & Shuster

[57] ABSTRACT

A fluid power assisted vehicle steering system which is switched between manual and automatic control by an operational mode selector, and switched from automatic to manual control without the intervention of the mode selector by an override action in response to operation of the manual steering control. Once switched to manual control, the steering system remains in the manual control mode of operation until switched by the mode selector to automatic control. Automatic control is also prevented until various safety conditions are satisfied.

19 Claims, 7 Drawing Figures

VEHICLE STEERING ASSIST

BACKGROUND OF THE INVENTION

This invention relates generally to the automatic steering of vehicles by scanning of a directrix or external course-determining facility. This directrix may be of the physical type, such as a furrow in the ground, a cutting edge of grain or other crops to be harvested, or a curbstone edge. The invention is also applicable to use with a directrix formed, for example, by a laser beam or the electro-magnetic field of a cable embedded in the ground. An appropriate sensor must accordingly be provided capable of scanning the associated directrix. In all cases, the driver of the vehicle is relieved of the tiring steering activity as long as a useable directrix is available thereby enabling the driver to concentrate attention on supervising operation of the engine, for example, or the cutting and threshing action of a combine. The driver is thereby able to make full use of all vehicle capabilities, such as speed of travel and width of cutting of a combine.

In connection with power assisted steering systems that are operated under automatic control, facilities must be provided for restoring the steering system to manual control operation. According to prior art arrangements as disclosed for example in a technical article by Hesse and Moeller appearing in "Landbauforschung Voelkenrade", issue No. 17 of 1973, pages 41–46, a sensor and regulating system for automatic steering operation is provided wherein both a feeler as well as a steering angle signal generator attached to a steerable wheel, deliver electric signals which operate an otherwise hydraulic regulating and control system. In an emergency situation, such as interruption in the operation of the directrix, vehicle steering must be restored to manual control. This was accomplished in prior art arrangements by means of an electrically operated restoring valve so that change-over from automatic to manual control required a special switching action before manual control through the steering control wheel became operative. Further, such prior art arrangements were highly susceptible to breakdown in the electrical control sections of the system to make mode switching unreliable.

SUMMARY OF THE INVENTION

As a result of the present invention, a vehicle power assisted steering system is provided which is constructed without electrical switching parts except for the feeler, position indicator and comparator forming a signal generator. As a result, energy from the electrical supply source is conserved and hydraulic losses reduced. More importantly, electrical malfunction is minimized by eliminating susceptibility of the system to breakdown of electrical switches. Further, the present invention enables override of the automatic control operation by merely superimposing manual override control at the steering wheel. This was not possible through the electrical control systems of prior art arrangements since the electrical contacts utilized could not be forcibly closed. Accordingly, it was always possible that despite intervention at the steering wheel, prior systems would not switch over from automatic to manual control. In the case of hydraulic systems, a plugged up valve could only be made to function again by expenditure of power at the steering wheel.

As a result of the present invention, a power assisted steering system is provided, wherein both manual steering as well as automatic steering operate hydraulically and therefore make possible the desired compulsory overriding of automatic control operation. Upon switching to automatic control operation, a signal operated means is controlled hydraulically from the signal generator which delivers a differential signal as a result of feeler measurement of the distance from the aforementioned directrix and a measurement of the course establishing steering angle. Return to manual control by intervention at the steering wheel is effected by shift of a valve piston in response to manual operation of the usual hydrostatic steering device, as a result of which the signal connection from the signal generator to the signal operated means effecting automatic control, is interrupted and a direct connection is established between the hydrostatic steering device and the steering servomotor. Power assisted steering then operates as though automatic control did not exist.

According to one embodiment of the invention, a constructional simplification is achieved in piston valves forming the signal operated means and the overriding means by housing thereof in a common valve bore under the mutual bias of a common spring. According to another feature of the invention, a fluid pressure controlled reversing valve is actuated in order to cause switchover between automatic and manual control by terminating inflow of pressure fluid to the control valves to thereby terminate the automatic control action of the control valves as well as their amplifying effect. The reversing valve is characterized by a holding action whereby manual operation remains in effect upon changeover thereto. This prevents indeterminate operation of the feeler whenever the directrix is no longer present. Automatic operation does not automatically resume but may only be re-established by a special switching process. Under emergency situations, the reversing valve also reliably and rapidly effects changeover to manual control operation. A very simple arrangement for switching the reversing valve between manual and automatic positions under control of a mode selector operated pressure relief valve is provided. The pressure relief valve also acts as a suction valve for the hydrostatic steering device in the event of failure of the pressure source. Fluid is then aspirated from the fluid reservoir through the opened pressure relief valve.

The power assisted steering system in accordance with the present invention must satisfy certain safety conditions before automatic operation is possible. Thus, switching to automatic control operation can only be effected when the driver is in his seat, an operating tool is in operating position, and a lower than high gear ratio is engaged in the change-speed transmission of the driven vehicle.

Should a change-over to manual control occur simultaneously with failure of the pressure fluid pump, unintentional drain of the pressure fluid conveyed by the manual pump of the hydrostatic steering device is prevented. Toward this end, a short circuit is established through the aspiration line of the hydrostatic device, its metering pump and the steering outlet line.

According to one embodiment of the invention, the main portion of the automatic system is housed in a common valve body which may be attached to the housing of the hydrostatic steering device. The aforementioned pressure relief valve may be housed in the same valve body. Control over the system may then be exercised by the driver through a short mechanical linkage thereby eliminating separate hydraulic lines.

In yet another embodiment of the invention, a simple and reliable arrangement of the feeler for cutting edges, the position indicator for the steering angle, and the comparator form a hydraulic turning angle signal generator. In other embodiments, the feeler and the position indicator are separately disposed at different places or at the same place on the vehicle.

In yet another embodiment of the invention, a single valve element such as disclosed in German Patent No. 2233624 forms the signal operated means which is however overridden through two override valve pistons in accordance with the present invention.

DETAILED DESCRIPTION OF PREFERRED EMBODIMENTS

General Control System

Figure 1:
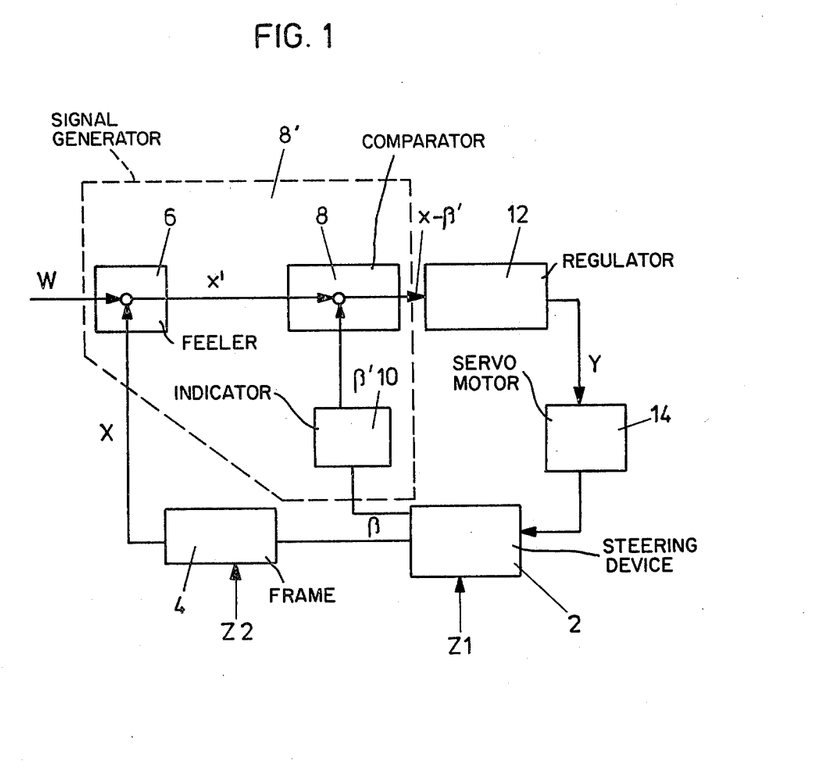
FIG. 1 is a block diagram of the power assisted steering system in accordance with the present invention.

The block diagram of FIG. 1 shows a portion of the control circuit formed by a steering device 2 (such as a steering lever) and the remaining vehicle frame 4 to which variable displacing forces Z-1 and Z-2 are applied respectively, such as forces acting on the chassis and on the operating engine. A control signal in line X reflects the distance of the frame of the vehicle from the directrix measured by a feeler 6. The feeler scans the directrix mechanically in a manner well known in the art. The desired distance from the directrix is set on the feeler as guiding value W. The feeler forms part of a hydraulic signal generator from which a starting signal X' is a measure of deviation, namely, the difference between the desired and actual distances from the directrix. The hydraulic output signal which corresponds to such deviation is either a pressure or an electric current and is fed to a signal comparator 8. A signal β reflecting the steering angle between one of the steerable wheels and the frame of the vehicle is measured by a position indicator 10 supplying a starting signal β' to the comparator 8. The comparator computes the difference between the starting signals to feed a differential signal (X'-B') to regulator 12 having an amplifier action. The starting signal of the regulator has an adjusting value (Y) fed to the servomotor 14 which is in the form of an operating cylinder device. The servomotor acts mechanically on the steering lever 2 to complete the regulating circuit loop depicted in FIG. 1. Thus, an interfaced regulating circuit is shown with an auxiliary regulating value corresponding to the steering angle. As a result of this value, a change in the steering angle is detected by the regulator with less delay to avoid overrun action of the regulator. The position indicator 10, the feeler 6 and the comparator 8 may be combined as a unit 8' as shown to form the signal generator.

Hydromechanical Signal Generator

Figure 2:
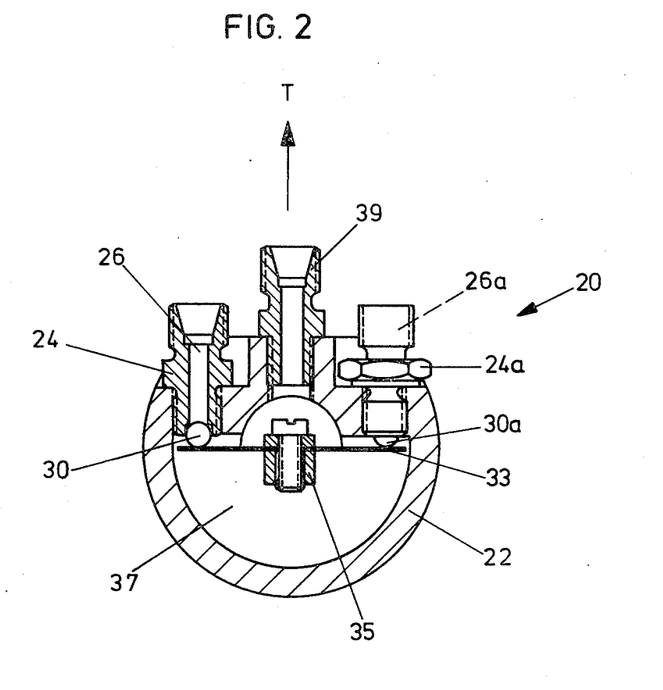
FIG. 2 is a section view through a hydromechanical form of signal generator associated with the present invention.

According to one embodiment of the invention, the feeler, the position indicator and the comparator function to scan mechanically directrices as a hydromechanical type of signal generator. Mechanical feelers are known per se. FIG. 2 shows such a signal generator 20 having a housing 22 which is adapted to be attached to the vehicle and two pressure retention valves 24 and 24a. These valves have intake chambers 26 and 26a adapted to be blocked at their outlet ends by ball check valves 30 and 30a. A leaf spring 33 holds both check valves on their valve seats and is attached to a terminal element 35 of a shaft extending transversely to the plane of the section shown. The leaf spring is pivotally displaceable through element 35 relative to the ball valves 30 and 30a and is thereby effective to change the fluid pressures prevailing in the intake chambers 26 and 26a. Fluid such as oil flows into an outlet chamber 37 in the housing and is discharged through an outlet fitting 39. In order to measure a steering angle or the deflection of a feeler by a directrix, the housing 22 is connected with one part while the shaft extending from element 35, is connected to another part pivotally displaceable relative to the part to which the housing is connected.

Basic Construction and Function of System

Figure 3:
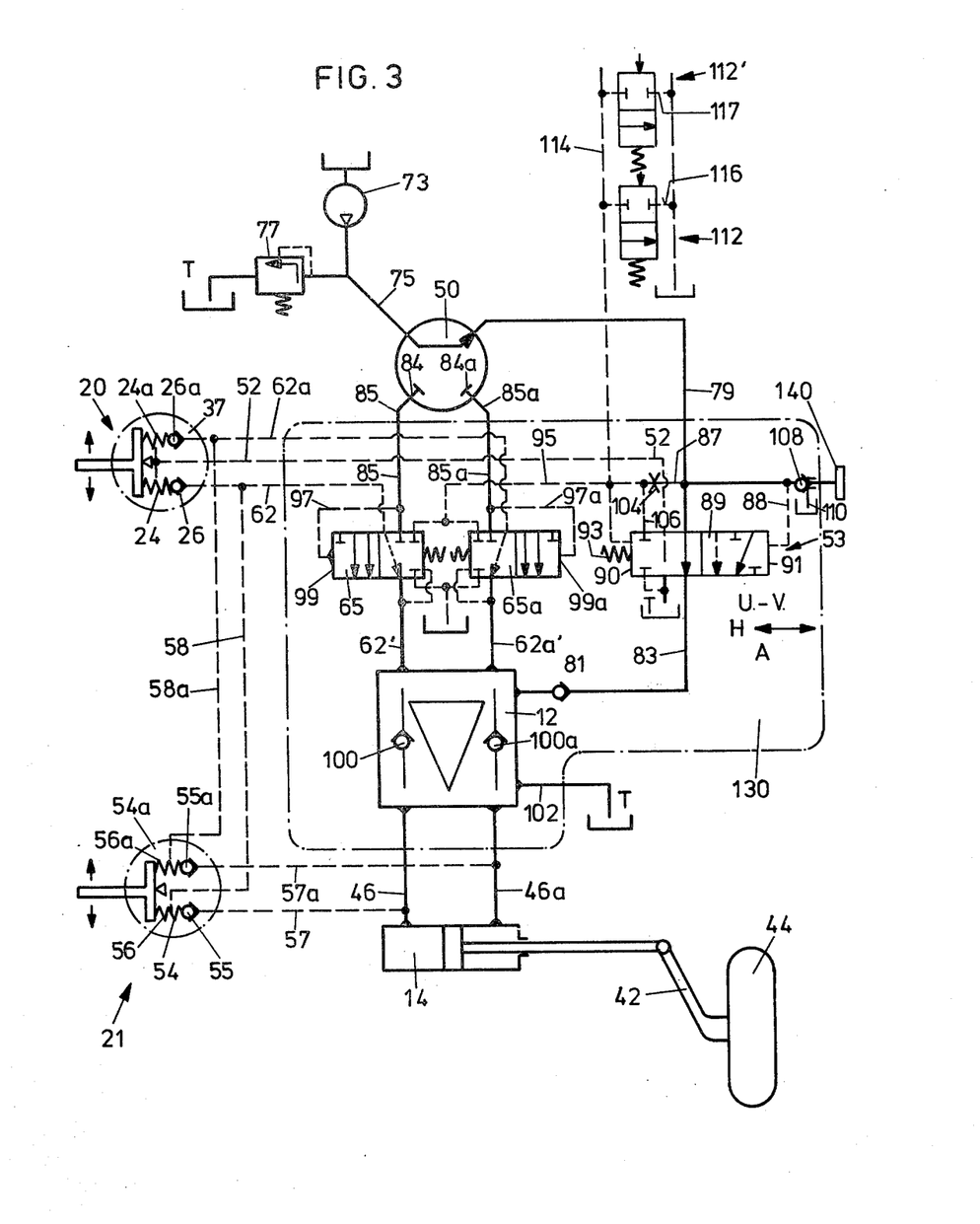
FIG. 3 is a hydraulic circuit diagram of the power assisted steering system in an automatic control condition.

FIG. 3 illustrates the basic system wherein the servomotor 14 in the form of a piston-cylinder device acts on the steering device in the form of a lever 42 extending from a steerable vehicle wheel 44. The servomotor is operated through two hydraulic lines 46 and 46a which in turn are pressurized either directly by a hydrostatic steering device 50 (of well known construction) bypassing the control valves of the regulator 12, or automatically by two hydromechanical signal generator 20 and 21 through the regulator 12.

In the embodiment shown in FIG. 3, the two signal generators 20 and 21 are attached at two different locations to the vehicle. One of the signal generators scans the directrix while the other measures the steering angle. The signal generator 20 may be constructed in accordance with FIG. 2 wherein the outlet chamber 37 is connected with a common drain line 52 for both valves 24 and 24a. During automatic control operation, the common drain line 52 exhausts fluid to a reservoir tank T through a reversing valve assembly 53 to be described in detail hereafter. The signal generator 21 is similar to generator 20 in that it has two valves 54 and 54a provided with two separate intake chambers 56 and 56a and associated check valves 55 and 55a but no common outlet chamber. While the valves 24 and 24a of the signal generator 20 function to change the pressure in the intake chambers 26 and 26a and the hydraulic lines connected thereto, the valves 54 and 54a of the signal generator 21 act as restrictors in order to influence the force exerted by fluid flow. The intake chambers 56 and 56a of the signal generator 21 are connected to lines 46 and 46a of the servomotor 14 through the check valves 55 and 55a and the lines 57 and 57a. Also, the intake chambers 56 and 56a of signal generator 21 are connected to the intake chambers 26 and 26a of the signal generator 20 by lines 58 and 58a to which lines 62 and 62a are connected. Overriding valves 65 and 65a to be described in detail hereafter connect the signal generators 20 and 21 through lines 62 and 62a and lines 62' and 62a' to the inlets of the regulator 12.

A fluid pressure oil pump 72 conveys oil from a supply tank to a pressure line 75 connected through an excess pressure valve 77 to the reservoir tank T. The hydrostatic steering device 50 is connected to pressure line 75 and has a metering pump and an associated valve piston (not shown) to be operated by the manual steering wheel (not shown) in a manner well known in the art. The metering pump forms a metering arrangement for the pressure fluid supplied by the pressure oil pump 73. FIG. 3 symbolically shows the hydrostatic steering device 50 in its neutral position wherein two control outlets 84 and 84a are closed. In this neutral position, pressurized fluid flows from line 75 into line 79 and is thereby conducted by the reversing valve 53 to line 83 and through a one-way check valve 81 to the regulator 12. The regulator is thereby supplied with pressurized fluid necessary for achieving its amplyifying effect in the power assist steering system. Depending on the rotation of the manual steering wheel, one or the other of the two control outlets 84 and 84a of the hydrostatic steering 50 will be hydraulically connected to the pressure line 75 through the metering pump associated with the hydrostatic steering device 50.

In the neutral position of the hydrostatic steering device shown, the feed line 83 to the regulator 12 is under pressure. This pressure acts on the two end pressure faces 90 and 91 of a valve piston 89 in the reversing valve 53 through lines 87 and 88. The pressure forces acting on the valve piston balance each other so that the valve piston is held in a stabilized position as shown in FIG. 3 by spring 93. In this position, line 79 from the hydrostatic steering device 50 is connected to the feed line 83 for supplying pressurized fluid to the regulator 12. At the same time, line 52 from the signal generator 20 is connected to the reservoir tank T through the valve piston 89. Automatic control operation is then in effect.

The override valves 65 and 65a in the positions shown in FIG. 3 establish fluid connections between signal lines 62 and 62a of the signal generator 20 and the regulator 12 but block direct fluid connections of the output lines 85 and 85a from the hydrostatic steering device 50 to the regulator 12. A pressure relief line 95 extends from the pressure operating face 90 of the valve 53 to the tank but is blocked by the override valves. The servomotor 14 is accordingly controlled by the signal generators 20 and 21 through the regulator 12.

In order to change over to manual control operation, the hydrostatic steering device 50 need only be actuated by the hand steering wheel. As a result, pressurized fluid is conveyed, for example, to the control output line 85 and is applied through branch line 97 to the pressure operating face 99 of the override valve 65 in order to displace it to its operative position from that shown. A direct fluid connection is thereby established from the hydrostatic steering device to the regulator through check valve 100 conducting pressurized fluid to one side of the servomotor 14. The other side of the servomotor is then relieved through line 46a, the regulator 12 and line 102 to the tank. Further, line 95 is then connected by shifted override valve 65 to the tank for exhausting the pressurized fluid therein. A pressure grandient therefore develops at flow restrictor 104 interconnecting line 87 to line 95. Accordingly, the pressure force acting on face 90 of valve 53 is reduced relative to the pressure force on end face 91 causing the valve 53 to be displaced to its other stable position corresponding to manual control operation of the system. In the manual control position of valve 53, the pressure in line 79 is relieved by connection to the tank. The valve 53 is maintained in its manual control position because line 95 remains relieved through its branch line 106 connected to the tank by the valve 53 even when the override valve 65 returns to its original position. Further, line 52 from the signal generator 20 to the tank is interrupted by the valve 53 in its manual control position so that the signal generators are unable to supply any signals to the regulator 12 and no pressurized fluid may be relieved through lines 57 and 57a to the tank. The foregoing automatic holding effect of the valve 53 will therefore continue manual control operation even if no further manual control is exercised through the hydrostatic steering device which resumes its neutral position. It will therefore be apparent that automatic control operation of the system is not restored. Instead, a special pressure relief valve 108 must be manually operated in order to obtain automatic control operation by connecting line 79 through line 110 to the exhaust tank. The flow restrictor 104 then loses its effect and the valve 53 returns to the automatic control position shown in FIG. 3 under the bias of spring 93.

Shift of the power assisted steering system to automatic control must be prevented whenever certain operating conditions have not been satisfied, such as driver seat occupancy, moderate speed setting for the controlling mechanism and operative positioning of a tool. For this purpose, monitoring valve switches 112 and 112', etc., are attached at proper locations to the vehicle and operating implements. These switch valves are normally locked in closed positions under prescribed operating conditions but will otherwise open. The switch valves are connected in parallel to each other and are disposed in an AND circuit arrangement. One side of the switch valves are connected through a line 114 to the spring chamber of the reversing valve 53 while the other sides are connected to the exhaust tank through lines 116 and 117. In the position shown in FIG. 3, the operating conditions are satisfied so that the monitoring valves 112 and 112', etc., are closed preventing any exhaust of fluid into the tank. Consequently, no pressure gradient occurs at the restrictor 104 enabling the valve 53 to assume the automatic position shown under the bias of spring 93. Should even a single one of the monitoring valves open, then a pressure gradient occurs at the restrictor 104 causing the valve 53 to switch over to its manual control position.

Feeler and Position Indicator Unit

Figure 4:
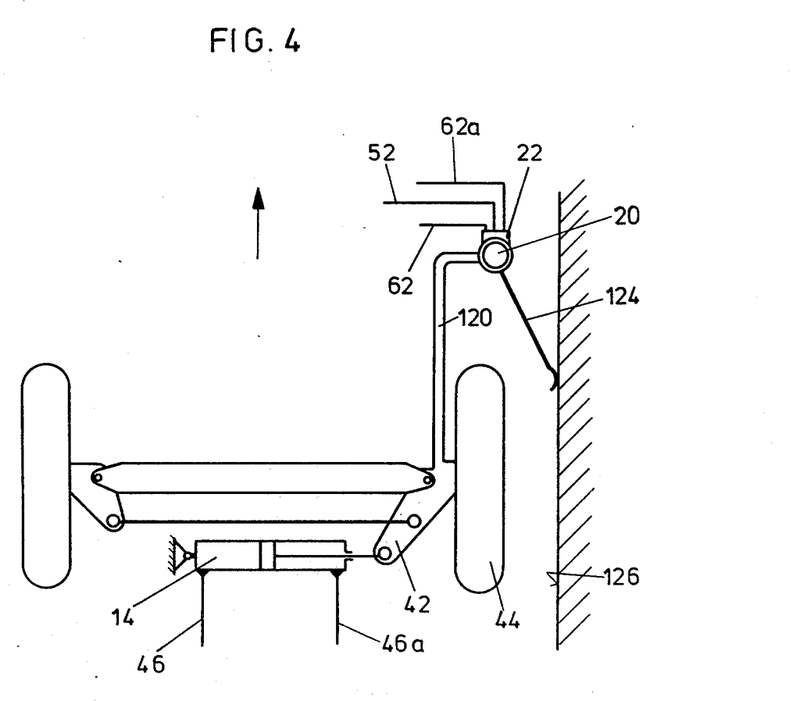
FIG 4 schematically illustrates an arrangement of a feeler and position indicator forming one constructional unit on a steering lever.

The sensor for scanning of the directrix should be arranged generally as far forward on the vehicle as possible. The position indicator for the steering angle on the other hand should be disposed on one of the steered wheels. If the steered wheels are at the front of the vehicle, then there is a possibility of combining the sensor and position indicator with one another in one unit 8', as shown in FIG. 4. FIG. 4 thus shows an arm 120 projecting forwardly from the steering lever 42 to which it is rigidly connected, at its front and angulated end. The housing 22 of the signal generator 20 as hereinbefore described with respect to FIG. 2, is attached firmly to the arm 120 while a probing lever or feeler 124 scans a directrix 126 to actuate the valves 24 and 24a of the signal generator. Since the arm 120 experiences all movements of the steering lever 42, the signal generator 20 delivers the starting signal corresponding to an angular difference between the steering angle and the angle assumed by the probing lever 124 during scanning of the directrix 126. The signal generator 20 thus functions as the sensor 6, the position indicator 10 and the comparator 8, as depicted in FIG. 1, which also shows all combined in unit 8'. Such a combined sensor and position indicator is connected to the system by lines 52, 62 and 62a as depicted for the signal generator 20 in FIG. 3. However, the signal generator 21 and its lines 57, 57a, 58 and 58a are omitted. The functions performed by the valves 54 and 54a of the signal generator 21, restricting flow of fluid to the signal generator 20, is assumed by the check valves 100 and 100a in the regulator 12. The power assisted steering system otherwise operates in the same manner as hereinbefore described.

Control Valve Assembly

Figure 5:
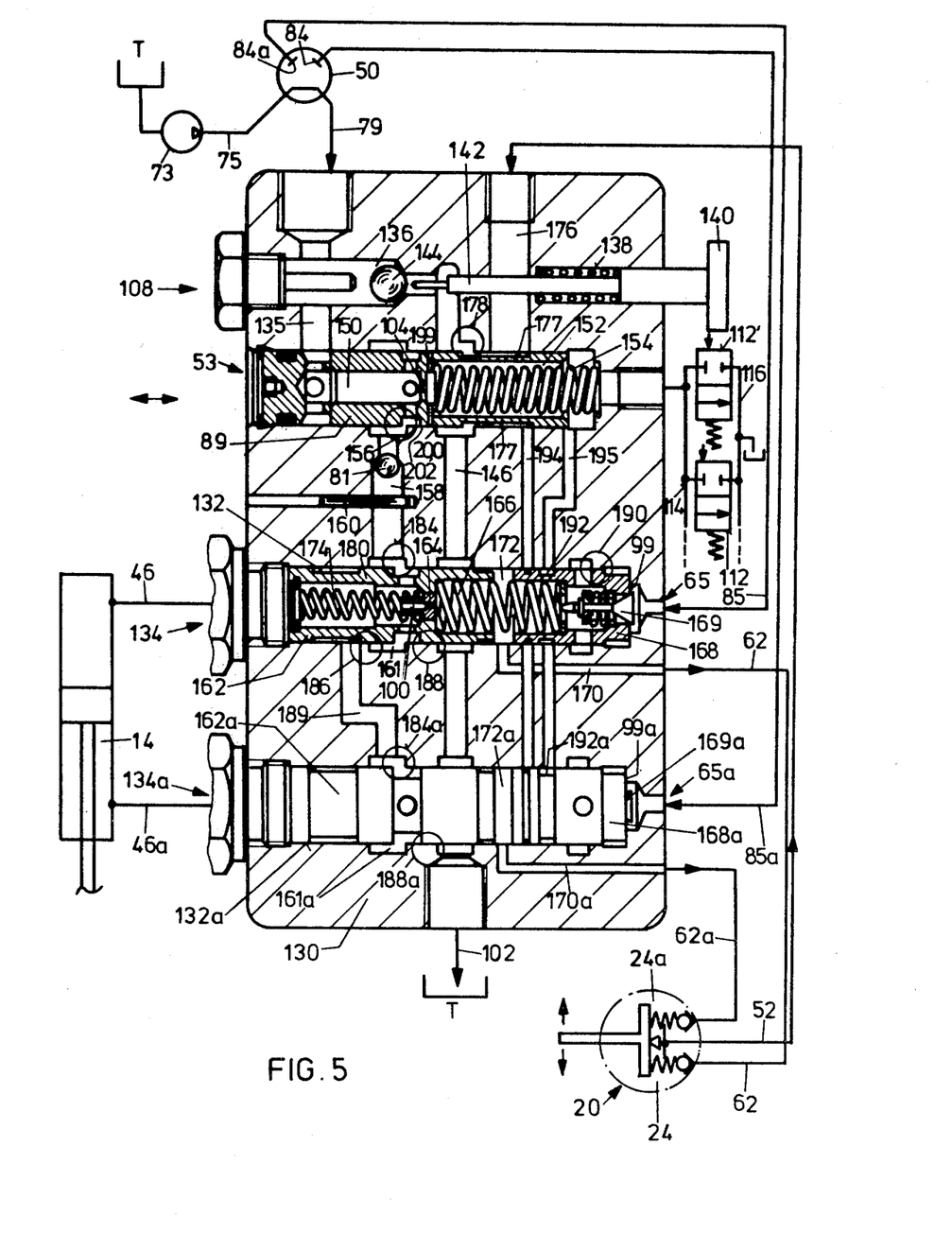
FIG. 5 is a section view and circuit diagram showing constructional details of the valve body and its hydraulic connections in an automatic control condition.

The dash-dot line in FIG. 3 encloses a control box 130' corresponding to the valve body 130 shown in FIG. 5 in which some of the reference numerals of FIG. 3 are found. The valve body 130 may be made in one piece or for easier manufacture in several parts. It is flanged onto the housing of the hydrostatic steering device whereby the control output lines 85 and 85a and the output line 79 of the hydrostatic steering device are connected directly with corresponding inlet openings of the valve body. The valve body may also be provided with a channel for the conduit 75 and as shown in FIG. 5 mounts the pressure relief valve 108 adjacent the top and the reversing valve 53 therebelow for effecting the changeover between manual control and automatic control. Below valve 53, a bore 132 extends from the left side of the valve body and mounts therein a control valve 134 in axial alignment with the override valve 65 on the right. Located therebelow in another common bore 132a, is another control valve 134a and the associated override valve 65a. The valve body 130 is hydraulically connected to a signal generator 20 in accordance with the embodiment depicted in FIG. 4 and is shown in the automatic control condition.

Pressurized fluid flows from the hydrostatic steering device through line 79 to an intake channel 135 in the valve body to which a main chamber 136 of the pressure relief valve 108 is connected. A pin 142 biased by a spring 138 to a retracted position, may be actuated by a manual mode selector button 140 to engage the ball check valve 144 and lift it from its seat to thereby connect the intake channel 135 with a return exhaust channel 146 leading down through the entire valve body to the tank through line 102. The pressure relief valve 108 performs two functions. Normally, upon actuation of the hand button 140, the valve 108 operates as a pressure relief to thereby condition the system for automatic control as will be described hereafter. Also, the valve 108 acts as a suction valve whenever the pump 73 fails and the supply from the tank through the pressure line 75 of the hydrostatic device 50 is interrupted. Thus, operation of the hydrostatic steering device may draw oil through channel 146 in the valve body past the pressure relief valve 144. The hand button 140 may be replaced by a short linkage guidingly mounted on the steering column of the vehicle, terminating at a location within operating range of the driver.

The valve 53 includes the spring-loaded piston 89, having an intake chamber 150 in fluid communication with the intake channel 135 in the automatic control position of the valve. The intake chamber 150 is connected through the flow restriction 104 with a spring chamber 152. The spring chamber 152 has a fluid connection externally of the valve body to the line 114 and the monitoring valves aforementioned. Whenever all of these monitoring valves are closed, then all drains of the spring chamber 152 are closed so that no flow through the restrictor 104 occurs since the same pressure prevails on both sides thereof. The piston 89 under the bias of spring 154 is thereby held in its left-hand position as shown corresponding to automatic control. In this position, a flow path is opened at port location 156 through a channel 158 in which a check valve 81 is retained by a peg 160. In order to supply the control valves with pressurized fluid, necessary for producing the amplifier effect, the channel 158 leads to an intake port 161 of a signal operated control valve 134. The valve piston 162 of the control valve 134 is urged to the left-hand position by a spring 166 and mounts a check valve 100 having a restrictive bore 164 establishing restricted fluid communication between spring chambers 174 and 172. The spring 166 is enclosed in chamber 172 between the valve piston 162 of the control valve 134 and a pressure responsive actuating piston 168 of the override valve 65 on the right. The piston 168 is equipped with a check valve 169, the effect of which will be described hereinafter. A channel 170 connects the spring chamber 172 between the valve pistons 162 and 168 through line 62 with the valve 24 of the signal generator 20 located externally of the valve body 130. The control valve 134a and its associated override valve 65a correspond in arrangement and function to the valves 134 and 65 so that the parts thereof are given the same reference numerals with the addition of "a". The intake chamber for valve piston 162a, however, is connected through a channel 189 to the valve 134 to which fluid is supplied through a port location at 186 from channel 158.

Automatic Operation

In the position shown in FIG. 5, fluid flows from the channel 158 into the chamber 174 of valve piston 162 connected to the servomotor 14 by conduit 46, and through the restrictive bore 164 into the spring chamber 172. From spring chamber 172, the fluid flows through channel 170 and line 62 to the valve 24 of the signal generator 20 from which it flows through line 52 and channel 176 in the valve body to an annular passage 177 on the piston 89 of the valve 53. A valve passage at port location 178 on valve 53 controls the drain of fluid through channel 146 to the tank. Because of the flow restricting effect of the restrictor bore 164, the piston 162 is shifted from its position shown further to the right. In the neutral position of the piston 162, a valve land 180 cooperates with port 161 to form a valve passage at location 184 controlling the inflow of fluid to the control valve 134a. During automatic control, the two valve pistons 168 and 168a of the override valves are at the right-hand positions shown. The control output lines 85 and 85a from the hydrostatic steering device 50 connected to the override valves are blocked by the hydrostatic steering device. All other drain openings to the tank except for the ports at locations 188 and 188a are blocked by the pistons 162, 162a, 168 and 168a.

Whenever the signal generator 20 is shifted mechanically, the signal pressures in lines 62 and 62a and in chambers 172 and 172a connected thereto, change. Consequently one of the pistons 162 and 162a is shifted to the right while the other is shifted to the left permitting fluid to flow to and from the servomotor 14. With further shifting of the pistons 162, or 162a to the right, the fluid flows into the channel 146 through an open valve passage at 188 or 188a.

Manual Control Operation

Whenever the hand steering wheel is operated while the system is set for automatic control, then the hydrostatic steering device 50 conveys pressurized fluid through one of the lines 85 or 85a to one of the pressure faces 99 and 99a at the right-hand ends of the piston 168 and 168a. One of the latter pistons is accordingly shifted to the left to block the outlet through channel 170. The piston 168, for example, mechanically and forcibly drives the piston 162 to the left either through spring 166 or by direct impact. Accordingly, all drains from the bore of both valves 134 and 65 are blocked. A valve passage at port location 190 then opens a path for the pressurized fluid from line 85 to the spring chamber 172 from which fluid flows only through the check valve 100 to the servomotor 14. A return path of fluid from the servomotor to the tank is established at the port location 188a by shift of the piston 162a to the right. This occurs because the check valve 169a opens as a result of the exhaust of fluid from the spring chamber 172a through line 85a and the hydrostatic steering device 50 to the tank. Since such exhaust flow of fluid is conducted through a restrictor bore in piston 162a (corresponding to restrictor 164 in piston 162) a pressure gradient develops under the influence of which the piston 162a is shifted to the right against the bias of its spring.

Whenever the hydrostatic steering device is returned to its neutral position, the piston 168 would ordinarily return to its right-hand terminal position to enable continued steering automatically. This is however prevented, so that steering operation when changed to manual control remains in the manual control mode until automatic control is again instituted by a deliberate and separate switching process. The persistence of manual control is achieved because shift of one of the pistons 168 and 168a to the left as viewed in FIG. 5 causes its ports 192 and 192a to bridge two channels 194 and 195. These two channels interconnect the bores of the valve 53 and both override valves 65 and 65a. When this occurs, pressurized fluid flows from spring chamber 152 to valve 53 through channel 195, the annular port 192 or 192a and the channel 195 to the wider annular passage 177 of valve 53 to the return channel 146. As a result, a pressure drop occurs in the spring chamber 152. The valve piston 89 is therefore forced to the right by pressure in chamber 150 until fluid flows through a radial bore 199 into the return channel 146. A valve passage at port location 200 then begins to function with the cooperation of the radial bore 199 which has the effect of holding the valve piston 89 in a position to the right of that shown wherein inflow to channel 158 and control valves 134 and 134a is blocked at port location 156 of valve 53. Further, in this position of the valve 53, the return flow in line 52 from signal generator 20 to the return channel 146 is also blocked at port location 178 so that no signal may be transmitted from the signal generator 20 and exhaust of pressurized fluid from the spring chambers 172 and 172a through valves 24 and 24a, line 52 and the annular passage 177 to the tank is prevented. The pressurized fluid from the hydrostatic steering device 50 in its neutral position supplied to the intake chamber 150 of the valve 53, is vented to channel 146 as a result of further shifting of valve piston 89 to the right. This is made possible by the valve action occuring at port locations 200 and 202. Further, the foregoing valve actions occur sequentially during shifting of the valve pistons 162 and 162a to the right as viewed in FIG. 5 in the following order:

First the valve passage at port location 156 closes followed by the automatic holding action of the valve passages at locations 199 and 200. The valve passage at port location 178 then closes and is finally followed by opening of the valve passages at port locations 200 and 202. The valve piston 89 may also be brought to the self-holding position described by one of the monitoring valves 112 as aforementioned whenever the driver relinquishes his seat, for example. The pressure in the spring chamber 152 is then relieved through line 114, the monitoring valve and line 116.

The steering system may be switched to automatic control by actuation of the hand button 140. When the ball valve 144 is thereby unseated, fluid flows from line 79 into return channel 146. The effect of the restrictor 104 then ceases as well as the self-holding effect on valve 53. The piston 89 is thereby forced by its spring 154 to the right and the previously described automatic control state is again re-established. Automatic control remains in effect until the hand wheel connected to device 50 is again operated.

Other Embodiments

Whenever the power assisted steering system is operated with two separate signal generators 20 and 21 as shown in FIG. 3, the valves 54 and 54a of transmitter 21 act as flow restrictors. The restrictor bores 164 associated with the check valves 100 and 100a in FIG. 5, are then eliminated. The same manual position holding effect occurs, however, because the lines 57, 58, 62 and 62' as shown in FIG. 3 represent a parallel circuit branch to the check valve 100. The same is true for the other parallel circuit branch formed by lines 57a, 58a, 62a and 62. In such parallel circuit arrangement, it makes no difference which of the parallel branches provides the flow restriction.

Figures 6, 7:
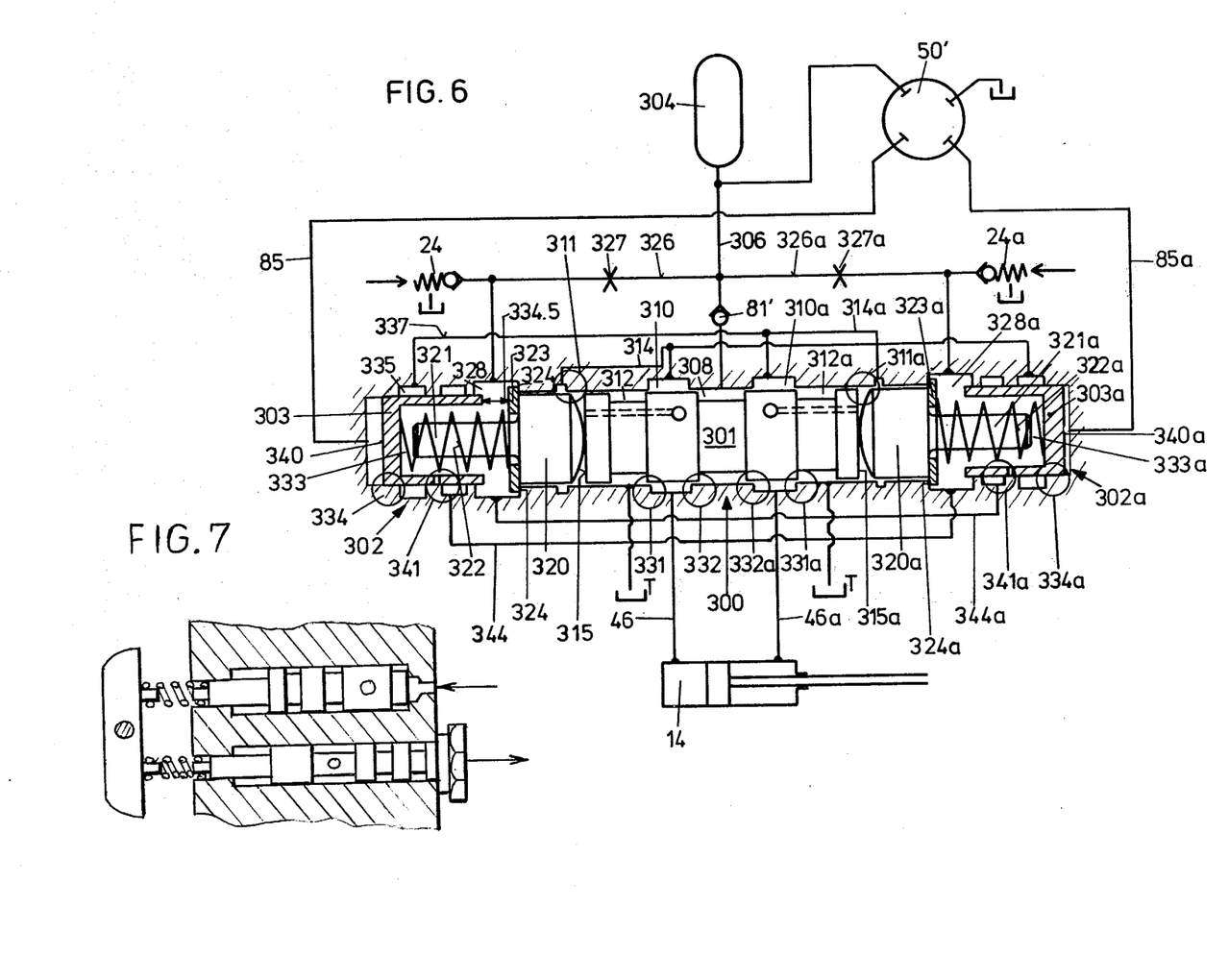
FIG. 6 is a schematic section view of another embodiment showing a single control valve element with associated override valves as well as associated hydraulic circuitry in the automatic control condition.
FIG. 7 is a partial section view of a valve body in accordance with yet another embodiment of the invention.

In the embodiment of FIG. 5, valve pistons 162 and 168, or 162a and 168a are always housed in one common bore. Therefore, there are always two control valves coacting. FIG. 6 shows, on the other hand, an embodiment wherein a single signal operated control valve 300 alone controls operation of the servomotor 14. In one bore, a piston 301 of the control valve 300 coacts with pistons 303 and 303a at opposite ends thereof, the pistons 303 and 303a forming parts of the overriding valves 302 and 302a. A storage tank 304 is connected by a line 306 to the feed line of a hydrostatic device 50' and through check valve 81' (which corresponds to the check valve 81 in FIGS. 3 and 5) is connected to the intake chamber 308 of the signal operated control valve 300. Two servomotor ports 310 and 310a are connected to the servomotor through lines 46 and 46a. Two exhaust chambers 312 and 312a are always connected with the reservoir tank. Abutting opposite ends of valve 301, are operating pistons 320 and 320a having piston rods 321 and 321a. The operating pistons are supported by compression springs 322 and 322a within the pistons 303 and 303a occupying the same bore. Between the operating piston 320 and compression spring 322 in valve 302, there is a ring disc 323 which abuts a shoulder 325 in the valve bore. A corresponding arrangement is associated with valve 302a. In this way, a centering effect for the piston 301 is achieved. The operating pistons 320 and 320a function to separate the two spring chambers in valves 302 and 302a through which automatic control is effected by signal pressure applied to the chambers at both ends of the piston 301. Adjacent the ends of the operating pistons 320 and 320a, facing the ends of piston 301, are valve passages at port locations 311 and 311a through which fluid communication with channels 314 and 314a, ports 310 and 310a and valve passages at port locations 334 and 334a is established. The line 306 is connected to the spring chambers 328 and 328a through branch lines 326 and 326a having flow restrictors 327 and 327a therein. The spring chambers 328 and 328a are connected to the valves 24 and 24a of a signal generator 20 as hereinbefore described having a connection to the exhaust tank.

For ideal functioning, certain overlaps and distances are required which are stated herein by way of example. In the central position of the piston 301 shown, valve surfaces at port locations 311 and 331 overlap by 1 mm. while the valve surfaces at port location 332 overlap by 2 mm. A gap 333 between the inside of piston 303 and the end of piston rod 321 has a spacing of 3 mm. The valve surfaces at port locations 334 have an overlap of 4 mm. and finally the distance 334.5 between the annular disc 323 and the end of piston 303 facing it is 4.5 mm. The same dimensions apply to the surfaces at port locations 311a, 331a, 332a, and 334a and gap 333a.

The foregoing embodiment forms a system which operates at a constant pressure whereby the servomotor is pressure locked in the neutral position. With the piston 301 in the central position as shown, the system is conditioned for automatic control. In this position, no flow occurs as long as the pressure balance prevails at the valves 24 and 24a of the signal generator 20. Whenever this balance changes as a result of mechanical operation of the signal generator 20 as hereinbefore described, the piston 301 is shifted to the left, for example, from its mid position by one of the operating pistons 320a. First, the valve passages at port locations 311 and 311a are opened. Then the valve passage at port location 332 is opened for conducting pressurized fluid from the intake chamber 308 to the servomotor 14 for operation thereof. The piston 301 reaches its terminal stop position after travel of the distance in gap 333. The fluid displaced from the servomotor returns to the tank through exhaust chamber 312a. The port 310 for the servomotor is connected by channel 314 and the open valve passage at port location 311 to the left end 315 of the piston 301. The pressurized fluid acting on this end of the piston attempts to shift it in opposition to the pressure built up by valve 24a in the right hand spring chamber 328a closing the valve passage at port location 332 once again. The piston 301 therefore acts through its valve passage at port location 332 to allow pressurized fluid to flow to the left side of the servomotor as long as the signal generator 20 controls the above assumed pressured difference in the two spring chambers. Whenever the differential pressure in the two spring chambers returns to zero, the piston 301 is again returned to its central position under the bias of spring 322 transmitted through piston 320. Fluid flow then ceases.

Whenever the steering wheel is manually turned, one of the operating surfaces, for example 340 of piston 303, receives pressurized fluid through line 85 causing the piston 303 to travel 3 mm. closing the gap 333. Piston 301 is subsequently driven by impact of the piston 303 with the end of piston rod 321. Should piston 303 and 320 be shifted an additional amount of 1 mm., the valve passages at port locations 334, 331 and 311a open. However, the valve passage at port location 332a does not open as yet. Accordingly, pressurized fluid then flows from line 85 through the annular port 335, line 314a, port 310a to the servomotor and returns through line 46, port 310 and the opened valve passage at port location 331 to the tank. Malfunction because of fluid inflow from the storage 304 will not occur because the feed chamber 308 remains closed under control of the valve passages at port locations 332 and 332a despite any further deflection of the steering wheel because travel of the piston 303 is limited to the distance 334.5, which exceeds that of gap 333 by one-half mm., following opening of the valve passage at port location 334.

The piston 303 is provided with an additional valve passage at port location 341 which opens briefly, for example, 1 mm. after shift of piston 303 begins. The foregoing valve passage is connected by a short circuit channel 344 with a spring chamber 328a of the right hand piston 303a. A corresponding arrangement is established by short circuit channel 344a. By means of the two short circuit channels, the differential pressure produced by the valves 24 and 24a is ineffective in the manual setting of the system.

From the method of operation described with respect to FIG. 6, it is apparent that the servomotor will be operated in the manual mode by the hydrostatic steering device 50' alone, bypassing the signal operating control valve 300 just as though automatic control did not exist. Provision is also made in the embodiment of FIG. 6 as in the case of the other embodiments, for the steering system to remain in the manual mode after actuation of the steering wheel as well as to enable switching to the automatic control mode by a separate switching process not described herein in detial. Also, in the FIG. 6 embodiment, monitoring valves are provided corresponding to the valves 112 aforementioned.

In another embodiment as shown in FIG. 7, the control valve assembly is modified so that only one valve piston is provided in each of four different bores of a common valve body. Two parallel bores as shown lead into the valve body from the same side, in contrast with the two valve pistons 162 and 168 in a common bore as shown in FIG. 5. Both valve pistons as shown in FIG. 7 may then be forcibly and mechanically interconnected by springs and a rocker. Another set of valve pistons are received in two additional bores and are interconnected in a like fashion.

I claim:
1. In a power assisted vehicle steering system having a manually operable hydrostatic control device (50), a servomotor (14) connected to at least one steerable vehicle wheel (44), control means (130) operatively connecting the hydrostatic device to the servomotor for displacement thereof under a manual control mode of operation, a direction controlling sensor (6), signal generating means (20) connecting the sensor to the control means for displacement of the servomotor in an automatic control mode of operation, and mode selector means (140) connected to the control means for selectively switching operation of the servomotor between said manual and automatic control modes, said control means including signal operated means (12, 134, 300) responsive to actuation of the mode selector means independently of servomoter operation for rendering the signal generating means effective to operate the servomotor in said automatic control mode, and overriding means (65, 302) connected to the hydrostatic control device for rendering the signal generating means ineffective in response to manual actuation of the hydrostatic control device independently of the mode selector means, whereby the manual control mode of operation is restored without switching thereto under selective control of the mode selector means.

2. The combination of claim 1 wherein said signal generating means includes fluid conduit means (62, 62a) connected to the signal operated means for displacement thereof under control of fluid pressure signals from the signal generating means in the automatic control mode of operation, said overriding means having pressure responsive actuating means (168, 320) connected to the hydrostatic control device for displacement in response to actuation of the hydrostatic control device, and mechanical means (166, 322) drivingly connecting the pressure responsive actuating means to the signal operated means for rendering said fluid conduit means to the signal operated means ineffective in response to said displacement of the pressure responsive actuating means.

3. In a power assisted vehicle steering system having a hydrostatic control device (50), a servomotor (14) connected to at least one steerable vehicle wheel (44), control means (130) operatively connecting the hydrostatic device to the servomotor for displacement thereof under a manual control mode of operation, a direction controlling sensor (6), signal generating means (20) connecting the sensor to the control means for displacement of the servomotor in an automatic control mode of operation, and mode selector means (140) connected to the control means for selectively switching operation of the servomotor between said manual and automatic control modes, said control means including signal operated means (12, 134, 300) responsive to the actuation of the mode selector means for rendering the signal generating means effective to operate the servomotor in said automatic control mode, and overriding means (65, 302) connected to the hydrostatic control device for rendering the signal generating means ineffective in response to actuation of the hydrostatic control device whereby the manual control mode of operation is restored without switching thereto under selective control of the mode selector means, said signal generating means including fluid conduit means (62, 62a) connected to the signal operated means for displacement thereof under control of fluid pressure signals from the signal generating means in the automatic control mode of operation, said overriding means having pressure responsive actuating means (168, 320) connected to the hydrostatic control device for displacement in response to actuation of the hydrostatic control device, and mechanical means (166, 322) drivingly connecting the pressure responsive actuating means to the signal operated means for rendering said fluid conduit means to the signal operated means ineffective in response to said displacement of the presure responsive actuating means, said control means further including a valve body (130) having a common valve bore (132) within which the signal operated means and the pressure responsive actuating means are displaceable, said mechanical means comprising a compression spring (166) within a chamber (172) formed in the common bore between the signal operated means and the pressure responsive actuating means, said pressure responsive actuating means including a valve piston (168) displaceable between a manual control position opening a flow path through the chamber between the hydrostatic control device and the servomotor and an automatic control position blocking said flow path, and a check valve (100) mounted by said signal operated means in said flow path conducting unidirectional flow of fluid through said flow path.

4. In a power assisted vehicle steering system having a hydrostatic control device (50), a servomotor (14) connected to at least one steerable vehicle wheel (44), control means (130) operatively connecting the hydrostatic device to the servomotor for displacement thereof under a manual control mode of operation, a direction controlling sensor (6), signal generating means (20) connecting to the sensor to the control means for displacement of the servomotor in an automatic control mode of operation, and mode selector means (140) connected to the control means for selectively switching operation of the servomotor between said manual and automatic control modes, said control means including signal operated means (12, 134, 300) responsive to the actuation of the mode selector means for rendering the signal generating means effective to operate the servomotor in said automatic control mode, and overriding means (65, 302) connected to the hydrostatic control device for rendering the signal generating means ineffective in response to actuation of the hydrostatic control device whereby the manual control mode of operation is restored without switching thereto under selective control of the mode selector means, said signal generating means including fluid conduit means (62, 62a) connected to the signal operated means for displacement thereof under control of fluid pressure signals from the signal generating means in the automatic control mode of operation, said overriding means having pressure responsive actuating means (168, 320) connected to the hydrostatic control device for displacement in response to actuation of the hydrostatic control device, and mechanical means (166, 322) drivingly connecting the pressure responsive actuating means to the signal operated means for rendering said fluid conduit means to the signal operated means ineffective in response to said displacement of the pressure responsive actuating means, said control means further including reversing valve means (53) displaceable between two stable positions under control of the mode selector means for conducting pressurized fluid to the servomotor in one of said stabilized positions.

5. The combination of claim 4 wherein said reversing valve means includes a spring loaded valve piston (89) having an inlet chamber (150), a spring chamber (152) interconnnected by a restrictive passage (104) to the inlet chamber, and port means (199, 200, 202) responsive to said displacement of the piston valve between said two stable positions for sequentially exhausting the spring chamber and the inlet chamber.

6. The combination of claim 5 wherein the reversing valve means further includes additional port means (156) for establishing fluid communication between the inlet chamber and the signal operated means before said exhaust of the inlet chamber.

7. The combination of claim 5 wherein said mode selector means includes pressure relief valve means (108) for momentarily exhausting pressurized fluid from the inlet chamber.

8. The combination of claim 3 including condition monitoring means (112) connected to the control means for preventing automatic control of the servomotor until predetermined operating conditions are satisfied.

9. The combination of claim 5 including condition monitoring means (112) connected to the control means for preventing automatic control of the servomotor until predetermined operating conditions are satisifed.

10. The combination of claim 9 wherein said condition monitoring means includes a pressure release valve (112) connected to the spring chamber of the reversing valve means.

11. The combination of claim 6 including unidirectional flow means (81) through which said fluid communication is established for blocking exhaust of fluid through the hydrostatic control device.

12. The combination of claim 7 wherein the hydrostatic control device has signal outlet means (84, 84a) connected to the overriding means, a drain line (79) connected to the reversing valve means and intake means (75) from which pressurized fluid is supplied to the control means through the signal outlet means and the drain line.

13. The combination of claim 12 wherein the valve body forms an intake passage (135) between the drain line and the inlet chamber, and an operating linkage connects the pressure relief valve means to the mode selector means.

14. The combination of claim 3 wherein said signal generating means includes feeler operated pressure retention means (24, 24a) connected to said chamber for controlling displacement of the signal operated means.

15. The combination of claim 14 wherein the signal generating means further includes feeler operated flow restriction means connected between the chamber and the servomotor in by-pass relation to the signal operated means.

16. The combination of claim 14 including constant flow restrictor means (164) interconnecting the chamber and the signal operated means for regulating displacement of the signal operated means.

17. In a power assisted vehicle steering system having a hydrostatic control device (50), a servomotor (14) connected to at least one steerable vehicle wheel (44), control means (130) operatively connecting the hydrostatic device to the servomotor for displacement thereof under a manual control mode of operation, a direction controlling sensor (6), signal generating means (20) connecting the sensor to the control means for displacement of the servomotor in an automatic control mode of operation, and mode selector means (140) connected to the control means for selectively switching operation of the servomotor between said manual and automatic control modes, said control means including signal operated means (12, 134, 300) responsive to actuation of the mode selector means for rendering the signal generating means effective to operate the servomotor in said automatic control mode, and overriding means (65, 302) connected to the hydrostatic control device for rendering the signal generating means ineffective in response to actuation of the hydrostatic control device, whereby the manual control mode of operation is restored without switching thereto under selective control of the mode selector means, said signal operated means comprising a single valve element (301) and said overriding means includes a pair of valve pistons (303 and 303a) at opposite axial ends of the valve element, and spring means (322, 322a) interengaged between the valve element and the valve pistons for yieldably holding the valve element centered between the valve pistons, said control means further including a valve body having a common valve bore within which the valve element and the valve pistons are located.

18. In a power assisted vehicle steering system having a hydrostatic control device (50), a servomotor (14) connected to at least one steerable vehicle wheel (44), control means (130) operatively connecting the hydrostatic device to the servomotor for displacement thereof under a manual control mode of operation, a direction controlling sensor (6), signal generating means (20) connecting the sensor to the control means for displacement of the servomotor in an automatic control mode of operation, and mode selector means (140) connected to the control means for selectively switching operation of the servomotor between said manual and automatic control modes, said control means including signal operated means (12, 134, 300) responsive to actuation of the mode selector means for rendering the signal generating means effective to operate the servomotor in said automatic control mode, and overriding means (65, 302) connected to the hydrostatic control device for rendering the signal generating means ineffective in response to actuation of the hydrostatic control device, whereby the manual control mode of operation is restored without switching thereto under selective control of the mode selector means, said control means further including a valve body having four different bores, each of said signal operated means and overriding means having a pair of axial valve pistons, each of the valve pistons occupying one of the four valve bores, and rocker means mechanically interconnecting the signal operated means and the overriding means through the valve pistons associated therewith.

19. In a power assisted steering system having a hand steering device (50) operable in a manual mode of operation, signal operated means (12) operable in an automatic mode of operation and mode selector means (140) for selectively switching operation of the system between said manual and automatic modes, the improvement residing in control means (130) for stabilizing operation of the system only in the manual mode and override means (65) responsive to manual actuation of the hand steering device for forcibly switching operation of the system from the automatic to the manual mode independently of the mode selector means.

* * * * *